United States Patent
Kim et al.

(10) Patent No.: US 8,036,011 B2
(45) Date of Patent: Oct. 11, 2011

(54) MEMORY MODULE FOR IMPROVING SIGNAL INTEGRITY AND COMPUTER SYSTEM HAVING THE SAME

(75) Inventors: Kyoung Sun Kim, Uijeongbu-si (KR); Do Hyung Kim, Yongin-si (KR); Sung Joo Park, Anyang-si (KR); Baek Kyu Choi, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 34 days.

(21) Appl. No.: 12/592,022

(22) Filed: Nov. 18, 2009

(65) Prior Publication Data

US 2010/0125693 A1   May 20, 2010

(30) Foreign Application Priority Data

Nov. 19, 2008   (KR) .................. 10-2008-0115050

(51) Int. Cl.
*G11C 5/06* (2006.01)

(52) U.S. Cl. ........ 365/63; 365/51; 365/230.03; 365/198

(58) Field of Classification Search ................. 365/63, 365/51, 230.03, 191, 198
See application file for complete search history.

(56) References Cited

U.S. PATENT DOCUMENTS

| | | | |
|---|---|---|---|
| 6,519,173 B2 * | 2/2003 | Funaba et al. | 365/63 |
| 7,339,840 B2 * | 3/2008 | Wallner et al. | 365/191 |
| 2006/0184756 A1 * | 8/2006 | Djordjevic et al. | 711/167 |
| 2007/0019494 A1 * | 1/2007 | Moosrainer et al. | 365/230.03 |
| 2007/0061614 A1 | 3/2007 | Choi | |
| 2007/0189049 A1 * | 8/2007 | Djordjevic et al. | 365/51 |

FOREIGN PATENT DOCUMENTS

JP   2007-80258 A   3/2007

* cited by examiner

*Primary Examiner* — Connie Yoha
(74) *Attorney, Agent, or Firm* — Onello & Mello LLP

(57) ABSTRACT

A memory module includes a plurality of buses and a plurality of memory chips arranged close to each other along each of the plurality of buses. An N-th memory chip, where N is an integer, of the plurality of memory chips is connected to any one of the plurality of buses, and each of the other memory chips of the plurality of memory chips, except for the N-th memory chip, is connected to the other one of the plurality of buses.

6 Claims, 8 Drawing Sheets

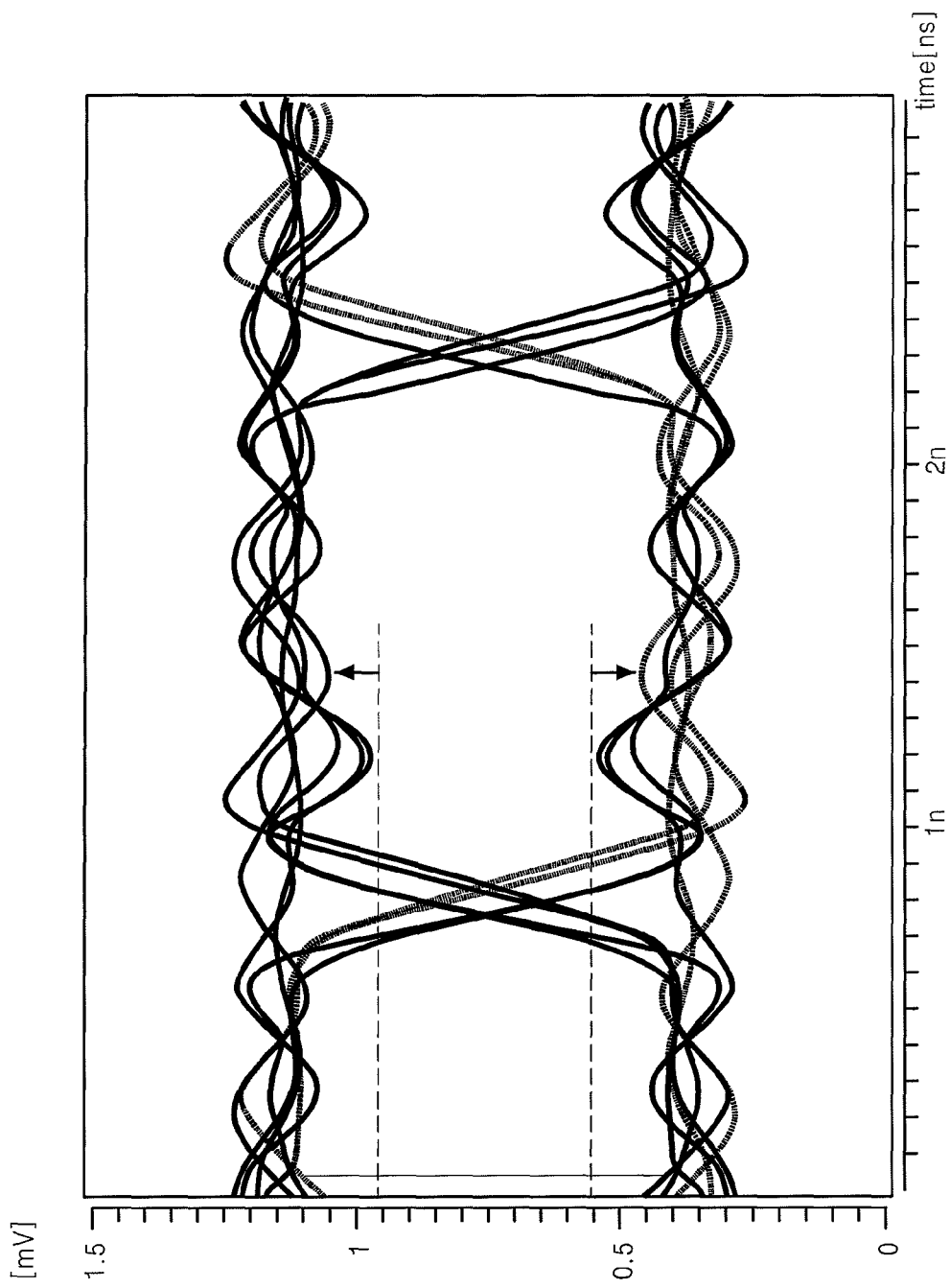

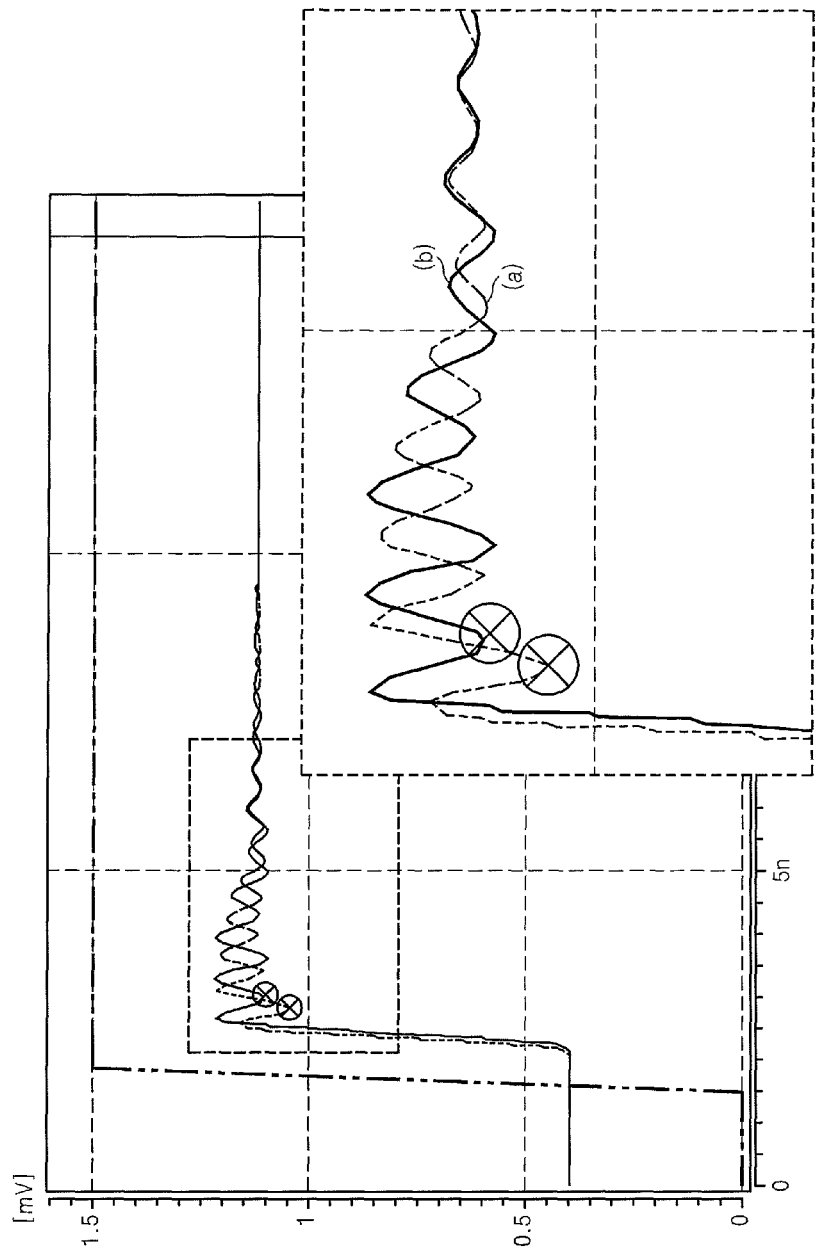

MEMORY MODULE FOR IMPROVING SIGNAL INTEGRITY AND COMPUTER SYSTEM HAVING THE SAME

CROSS-REFERENCE TO RELATED APPLICATIONS

This application claims the benefit of Korean Patent Application No. 10-2008-0115050, filed on Nov. 19, 2008, in the Korean Intellectual Property Office, the disclosure of which is incorporated herein in its entirety by reference.

BACKGROUND

The inventive concept relates to a semiconductor device, and more particularly, to a memory module which may improve signal integrity, and a computer system having the memory module.

As semiconductor devices are gradually made compact, get faster, and are highly integrated, the number of parts, that is, memory chips or memory devices, mounted on a memory module increases so that the configuration of a system of the memory module is complicated. In a semiconductor device performing high speed communications, the operational frequencies of an integrated circuit (IC) such as the memory device are gradually increased. The high frequency signals are designed to be transmitted at a similar frequency between the ICs.

When data is transmitted and received at high frequency through a transmission line between ICs, a problem such as signal reflections or interferences may be generated due to impedance mismatch between the transmission line and parts for transmitting and receiving the data. Such a problem may easily cause noise on the transmission line which changes the waveform of a signal so that signal distortion is increased. Accordingly, in the memory module, signal integrity that is one of important factors in transmitting a signal with reliability in high speed communications may be deteriorated. Thus, there is a demand for a memory module that may improved signal integrity.

SUMMARY

The inventive concept provides a memory module which may reduce a reflected wave on a transmission line by adjusting a pattern length between the transmission line and a part, without changing a conventional arrangement of parts and a deposition structure.

According to an aspect of the inventive concept, there is provided a memory module including a plurality of buses, and a plurality of memory chips arranged close to each other along each of the plurality of buses, wherein an N-th memory chip, where N is an integer, of the plurality of memory chips is connected to any one of the plurality of buses, and each of the other memory chips of the plurality of memory chips, except for the N-th memory chip, is connected to the other one of the plurality of buses.

A pattern length between the N-th memory chip and the any one of the plurality of buses may be longer than a pattern length between each of the other memory chips, except for the N-th memory chip, and the other one of the plurality of buses.

The plurality of memory chips and the plurality of buses may be arranged by a fly-by topology. The N-th memory chip may be the first memory chip of the plurality of memory chips. The memory module may be a registered DIMM (RDIMM) or an unbuffered DIMM (UDIMM).

According to another aspect of the inventive concept, there is provided a computer system including a memory slot, a memory module electrically connected to the memory slot, in which a plurality of memory chips are arranged, and a processor controlling input/output operations of the memory module. The memory module may include a plurality of buses, and the plurality of memory chips may be arranged close to each other along each of the plurality of buses.

An N-th memory chip, where N is an integer, of the plurality of memory chips may be connected to any one of the plurality of buses, and each of the other memory chips of the plurality of memory chips, except for the N-th memory chip, may be connected to the other one of the plurality of buses.

A pattern length between the N-th memory chip and the any one of the plurality of buses may be longer than a pattern length between each of the other memory chips, except for the N-th memory chip, and the other one of the plurality of buses.

BRIEF DESCRIPTION OF THE DRAWINGS

The foregoing and other features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention. In the drawings, the thickness of layers and regions are exaggerated for clarity.

FIG. 5B is an eye diagram illustrating signal integrity of the memory module of FIG. 3.

FIG. 6 is a graph illustrating signal integrity of a memory module according to an exemplary embodiment of the present inventive concept.

DETAILED DESCRIPTION OF THE EMBODIMENTS

Figure 1:
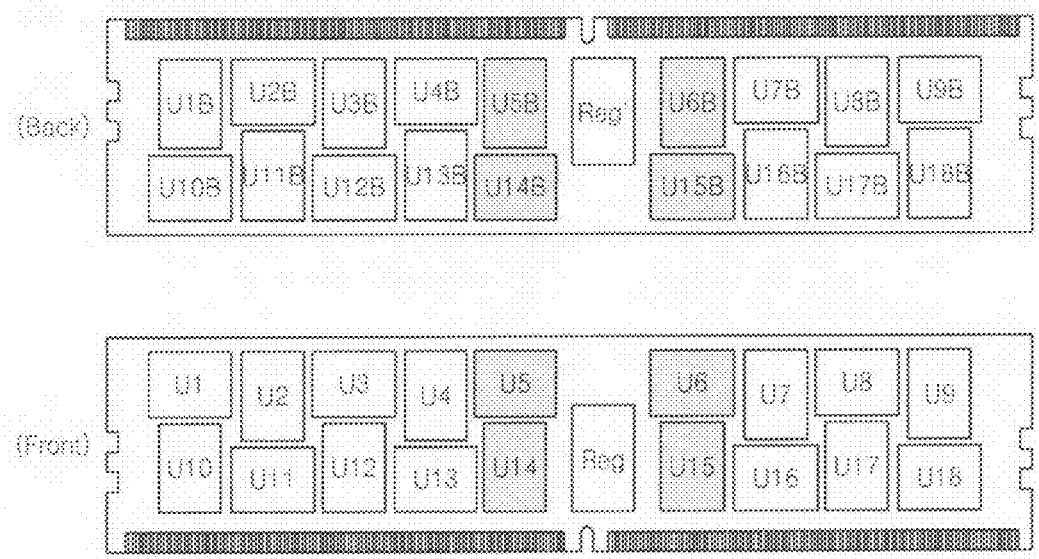
FIG. 1 is a schematic view illustrating the layout of a memory module according to an exemplary embodiment of the present inventive concept.

The attached drawings for illustrating embodiments of the inventive concept are referred to in order to gain a sufficient understanding of the inventive concept and the merits thereof. Hereinafter, the inventive concept will be described in detail through description of embodiments of the inventive concept with reference to the attached drawings. Like reference numerals in the drawings denote like elements.

FIG. 1 is a schematic view illustrating the layout of a memory module according to an exemplary embodiment of the present inventive concept. In FIG. 1, the upper portion and a lower portion of a module circuit board of a memory module are illustrated. The memory module may be implemented by a registered dual in-line memory module (RDIMM) or an unbuffered dual in-line memory module (UDIMM). For convenience of description, the memory module includes a single control chip and eighteen memory chips.

Referring to FIG. 1, a memory module includes a module circuit board and a plurality of parts such as a plurality of memory chips U1B-U18B and a control chip Reg. The module circuit board may be implemented by a multi-module circuit board having multiple layers. A plurality of pins, through which access signals and data signals are input or output to communicate with an external environment, are provided at a lower end of the module circuit board.

The control chip Reg and the memory chips U1-U18 are arranged on a front surface of the module circuit board. For example, the control chip Reg may be arranged at the center of the module circuit board and each of the memory chips U1-U18 may be arranged in two rows at the left and right sides of the control chip Reg. The memory chips U1-U18 are grouped into a plurality of memory groups, for example, a first memory group U1-U5, a second memory group U6-U9, a third memory group U10-U14, and a fourth memory group U15-U18, and are arranged around the control chip Reg by group.

The control chip Reg' and the memory chips U1B-U18B are arranged on a back surface of the module circuit board. For example, the control chip Reg' may be arranged at the center of the module circuit board and each of the memory chips U1B-U18B may be arranged in two rows at the left and right sides of the control chip Reg'. The memory chips U1B-U18B are grouped into a plurality of memory groups, for example, a first memory group U1B-U5B, a second memory group U6B-U9B, a third memory group U10B-U14B, and a fourth memory group U15B-U18B, and are arranged around the control chip Reg' by group.

The control chip Reg', in response to an access signal that is externally input through the respective pins, generates control signals to control the operation of each of the memory chips U1-18B and is connected to each of the memory chips U1-18B through a plurality of buses to transmit accessed control signals.

That is, the memory module may control input/output operations of data with respect to each of the memory chips U1-U18B, in response to the access signal that is externally input through at least part of the pins. Each of the control signals may be a chip select signal CS or a clock signal.

Also, the memory module may determine (or indicate) how much data is simultaneously read from the memory chips during a read operation or how much data is simultaneously written to the respective memory chips during a write operation. The number of the memory chips from which data may be simultaneously read during the read operation, or the number of the memory chips to which data may be simultaneously written during the write operation, may be determined according to the arrangement and structure of the memory chips U1-U18B and the data width of an external access bus. The control chip Reg or Reg' may perform an access operation at the same time for each of the memory groups based on a single control signal. For example, when the memory module has an X8 structure and the bus width of the external access bus is 72 bits, read or write access to nine (9) memory chips of the memory module may be simultaneously achieved.

Figure 2:
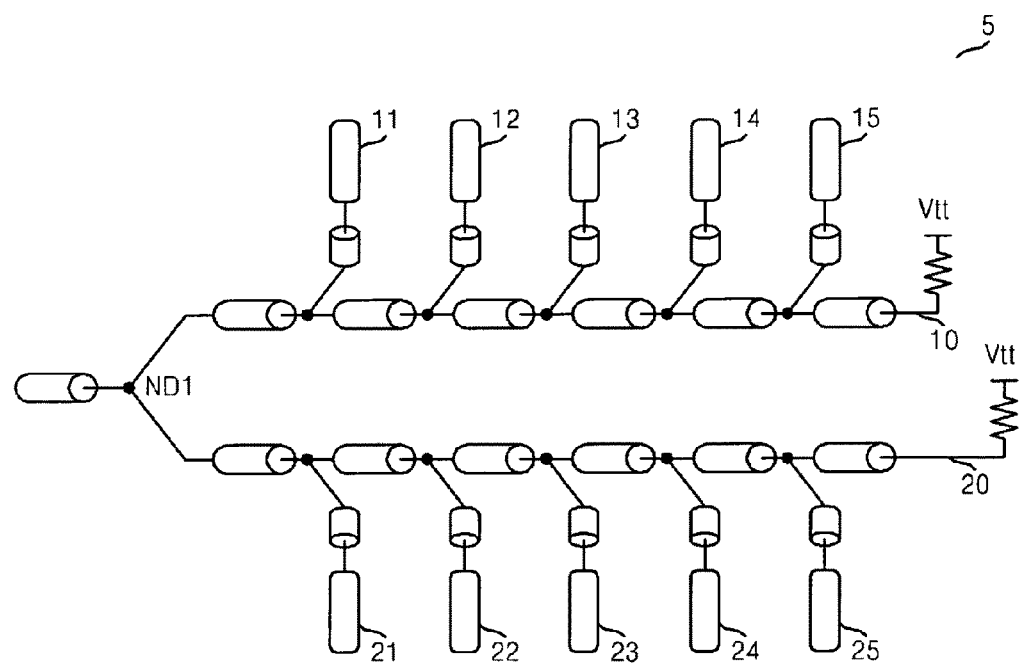
FIG. 2 is a block diagram schematically illustrating a memory module having a general bus structure.

FIG. 2 is a block diagram schematically illustrating a memory module 5 having a general bus structure. In the memory module 5, each of the memory chips uses a bus that is implemented by a fly-by topology. Referring to FIG. 2, the memory module 5 includes a first bus 10, a second bus 20, a plurality of first memory chips 11-15 arranged along the first bus 10 adjacent to each other, and a plurality of second memory chips 21-25 arranged along the second bus 20 adjacent to each other.

The memory module 5 is implemented by an on-die termination circuit (ODT). In the ODT, a termination resistor is connected to a bus, that is, a transmission line, to match impedance of the bus when data is transceived through the bus between parts, for example, memory chips.

The first memory chips 11-15 are sequentially connected to the first bus 10 that is adjacent thereto, and may perform an access operation, for example, a write operation and a write operation, simultaneously in response to a control signal transmitted through the first bus 10. The second memory chips 21-25 are sequentially connected to the second bus 20 that is adjacent thereto, and may perform an access operation, for example, a write operation and a write operation, simultaneously in response to a control signal transmitted through the second bus 20. When the first memory chips 11-15 are the first memory groups U1-U5 arranged on the module circuit board of FIG. 1, the second memory chips 21-25 may be at least one of the second memory group U6-U9 through the eighth memory group U15B-U18B.

The control signal output from the control chip Reg is branched at a first node ND1 to two transmission lines, for example, the first bus 10 and the second bus 20, and transmitted to the first memory chips 11-15 and the second memory chips 21-25 at a constant speed, respectively, along the branched first and second buses 10 and 20. When the control signal is applied to each of the memory chips, signal reflection may be generated at a boundary portion where the transmission line and each memory chip are connected to each other due to a difference in impedance value between the transmission line and a part, for example, the memory chip, connected to the transmission line.

A reflected wave generated due to the signal reflection and proceeding at a constant speed in the opposite direction to a direction in which the original wave, that is, the control signal, proceeds becomes noise on the transmission line. Accordingly, the amplitude of the reflected wave may be increased as a characteristic impedance value of the transmission line increases. In general, the noise generated due to the reflected wave appears most at the foremost end of the transmission line, that is, in the first memory chip of the memory chips connected to the transmission line.

That is, the control signal output through the first bus 10 overlaps a plurality of reflected waves generated in the previous cycle at the boundary portions where the first bus 10 and each of the first memory chips 11-15 are connected to each other, at the input end of the first bus 10, that is, at the boundary portion where the first memory chip 11 is connected to the first bus 10. Also, the control signal output through the second bus 20 overlaps a plurality of reflected waves generated in the previous cycle at the boundary portions where the second bus 20 and the second memory chips 21-25 are connected to each other, at the input end of the second bus 20, that is, at the boundary portion where the first memory chip 21 is connected to the second bus 20.

In the memory module 5 implemented by a fly-by topology, it is a problem that the reflected waves generated from the memory chips 11-15 and 21-25 connected to the transmission line are overlapped at the foremost end of the transmission line so that the largest ringback noise is generated in the first memory chips 11 and 21 of the memory chips 11-15 and 21-25.

Figure 3:
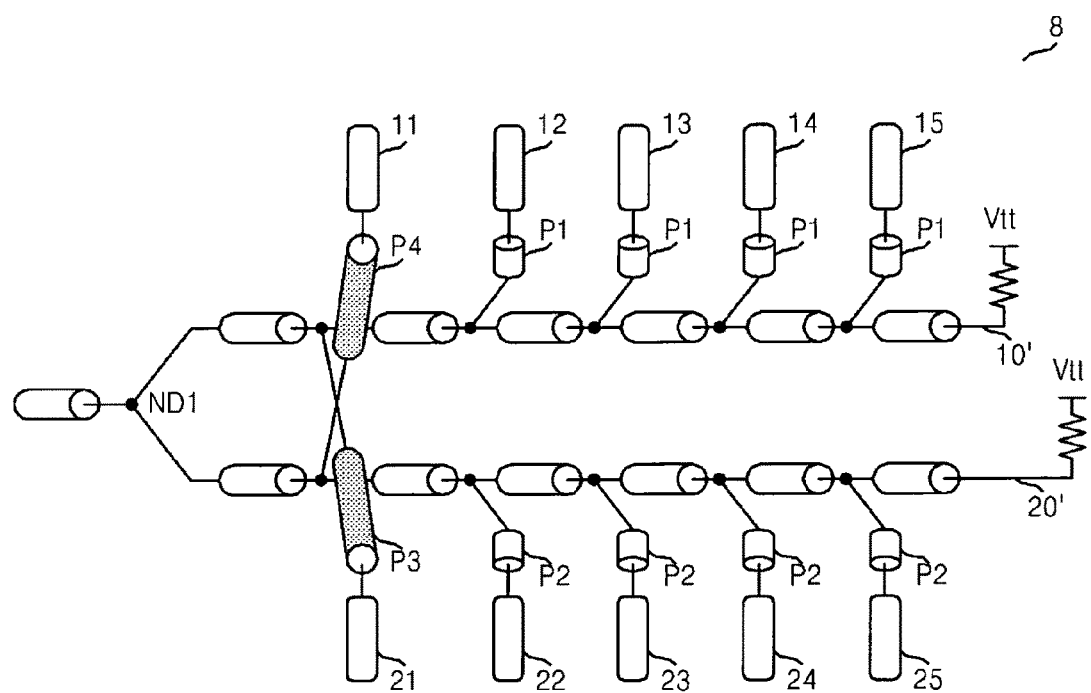
FIG. 3 is a block diagram schematically illustrating a memory module having a bus structure according to an exemplary embodiment of the present inventive concept.

FIG. 3 is a block diagram schematically illustrating a memory module 8 having a bus structure according to an exemplary embodiment of the present inventive concept. For convenience of description, the memory module 8 according to the present exemplary embodiment includes two buses 10' and 20' to transmit a single control signal and five memory chips connected to each of the two buses 10' and 20'. Also, in FIG. 3, the memory module 8 has a structure in which the plurality of memory chips and the plurality of buses are arranged by a fly-by topology. However, the present inventive concept is not limited thereto.

Referring to FIG. 3, the memory module 8 includes the first bus 10', the second bus 20', the first memory chips 11-15 arranged along the first bus 10' adjacent to each other, and the second memory chips 21-25 arranged along the second bus 20' adjacent to each other. When the first memory chips 11-15 belong to the first memory groups U1-U5 arranged on the module circuit board of FIG. 1, the second memory chips 21-25 may belong to any one of the second memory group U21-U24 through the eighth memory group U15B-U18B.

The control signal output from the control chip Reg is branched at the first node ND1 to two transmission lines, for example, the first bus 10' and the second bus 20', and transmitted to the first memory chips 11-15 and the second memory chips 21-25 at a constant speed, respectively, along the branched first and second buses 10' and 20'. The N-th memory chip 21, where N is an integer, for example, N=1, of the second memory chips 21-25, and the other memory chips 12-15 of the first memory chips 11-15, except for the N-th memory chip 11, are connected to the first bus 10'. The N-th memory chip 11 of the first memory chips 11-15 and the other memory chips 22-25 of the second memory chips 21-25, except for the N-th memory chip 21, are connected to the second bus 20'. That is, the N-th memory chip 11 of the first memory chips 11-15 and the rest of the first memory chips 12-15 are connected to different buses 10' and 20'. Also, the N-th memory chip 21 of the second memory chips 21-25 and the rest of the second memory chips 22-25 are connected to different buses 10' and 20'.

Since a pattern length P4 between the second bus 20' and the N-th memory chip 11 of the first memory chips 11-15 connected to the second bus 20' is longer than a pattern length P1 between the first bus 10' and each of the other memory chips 12-15 of the first memory chips 11-15, except for the N-th memory chip 11, connected to the first bus 10', transmission delay is generated. Thus, the memory module 8 may avoid a timing in which the control signal output from the control chip Reg overlaps a plurality of reflected waves generated in the previous cycle at the boundary portions where the first bus 10 and each of the first memory chips 12-15 are connected to each other, at the front end of the first bus 10', that is, at the boundary portion where the first memory chip 21 of the second memory chips 21-25 is connected to the first bus 10.

Also, since a pattern length P3 between the first bus 10' and the N-th memory chip 21 of the second memory chips 21-25 connected to the first bus 10' is longer than a pattern length P2 between the second bus 20' and each of the other memory chips 22-25 of the second memory chips 21-25, except for the N-th memory chip 21, connected to the second bus 20', transmission delay is generated. Thus, the memory module 8 may avoid a timing at which the control signal output from the control chip Reg overlaps a plurality of reflected waves generated in the previous cycle at the boundary portions where the second bus 20' and each of the second memory chips 22-25 are connected to each other, at the front end of the second bus 20', that is, at the boundary portion where the first memory chip 11 of the first memory chips 11-15 is connected to the second bus 20'.

Thus, the timing at which the reflected waves are overlapped at a particular cycle may be avoided by setting the time point when the control signal is applied to the transmission line and the time point when the reflected waves generated in the previous cycle proceed back to the N-th memory chip 11 or 21, to be different from each other. As described above, when the first memory chip 11 or 21 and the other memory chips 12-15 or 22-15 of the memory chips arranged close to each other are connected to different buses, a signal delayed with respect to the control signal applied to each of the other memory chips 12-15 or 22-25 is applied to the first memory chip 11 or 21 so that a limit in wiring due to a limited space may be overcome and a pattern length may be extended by the arrangements of P3 and P4.

Also, by setting the pattern lengths P3 and P4 between each of the first memory chip 11 or 21 and the other memory chips 12-25 or 22-25 of the memory chips arranged close to each other and the transmission line, to be different from each other, transmission delay is generated according to the pattern length extending from the first memory chip 11 or 21. Thus, the timing at which the reflected waves generated by the other memory chips 12-15 or 22-25 are overlapped at the front end of the transmission line may be avoided, thereby reducing ringback noise. Accordingly, signal integrity of the memory module 8 according to the present exemplary embodiment may be improved by employing different signal connection methods, without a change in the part arrangement and deposition structure of the conventional memory module 5.

Figure 4:
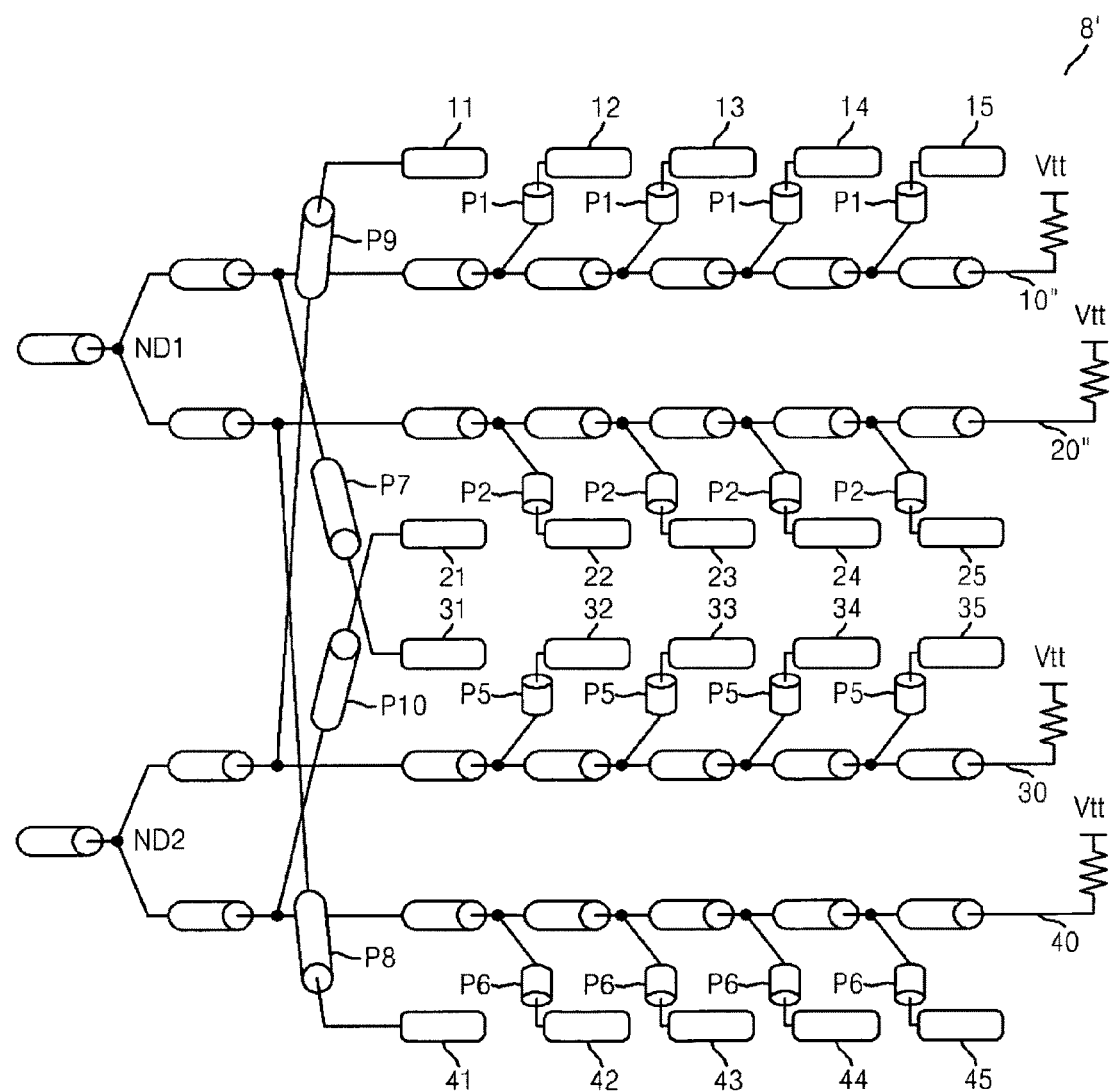
FIG. 4 is a block diagram schematically illustrating a memory module having a bus structure according to another exemplary embodiment of the present inventive concept.

FIG. 4 is a block diagram schematically illustrating a memory module 8' having a bus structure according to another exemplary embodiment of the present inventive concept. For convenience of description, the memory module 8' includes four buses 10", 20", 30 and 40 to transmit a single control signal and five memory chips connected to each of the four buses. However, the present inventive concept is not limited thereto and may include a plurality of buses to transmit a plurality of control signals and a plurality of memory chips.

Referring to FIG. 4, the memory module 8' includes the first bus 10", the second bus 20", a third bus 30, a fourth bus 40, the first memory chips 11-15 arranged along the first bus 10" adjacent to each other, the second memory chips 21-25 arranged along the second bus 20" adjacent to each other, a plurality of third memory chips 31-35 arranged along the third bus 30 adjacent to each other, and a plurality of fourth memory chips 41-45 arranged along the fourth bus 40 adjacent to each other.

The first control signal output from the control chip Reg is branched at the first node ND1 to the first bus 10" and the second bus 20", and a second control signal is branched at a second node ND2 to the third bus 30 and the fourth bus 40. The first control signal and the second control signal may be the same signal, but the present inventive concept is not limited thereto.

The N-th memory chip 31, where N is an integer, for example, N=1, of the third memory chips 31-35, and the other memory chips 12-15 of the first memory chips 11-15, except for the N-th memory chip 11, are connected to the first bus 10. The N-th memory chip 41, where N is an integer, for example, N=1, of the fourth memory chips 41-45, and the other memory chips 22-25 of the second memory chips 21-25, except for the N-th memory chip 21, are connected to the second bus 20.

The N-th memory chip 11 of the first memory chips 11-15, and the other memory chips 32-35 of the third memory chips 31-35, except for the N-th memory chip 31, are connected to the third bus 30. The N-th memory chip 21 of the second memory chips 21-25, and the other memory chips 42-45 of the fourth memory chips 41-45, except for the N-th memory chip 41, are connected to the fourth bus 40.

That is, since the N-th memory chip and the other memory chips except for the N-th memory chip are connected to different buses in each of the first memory chips 11-15, the second memory chips 21-25, the third memory chips 31-35, and the fourth memory chips 41-45, the pattern lengths P7, P8, P9, and P10 between the N-th memory chips and the corresponding bus and the pattern lengths P1, P2, P5, and P6 between the other memory chips and the corresponding buses may be set to be different from each other.

Each of the first memory chips 11-15, the second memory chips 21-25, the third memory chips 31-35, and the fourth memory chips 41-45 may belong to any one of the first memory group U1-U5 through the eighth memory group U15B-U18B of FIG. 1. Also, the memory module 8' may apply the control signal to each of the memory groups along a single bus.

Figure 5A:
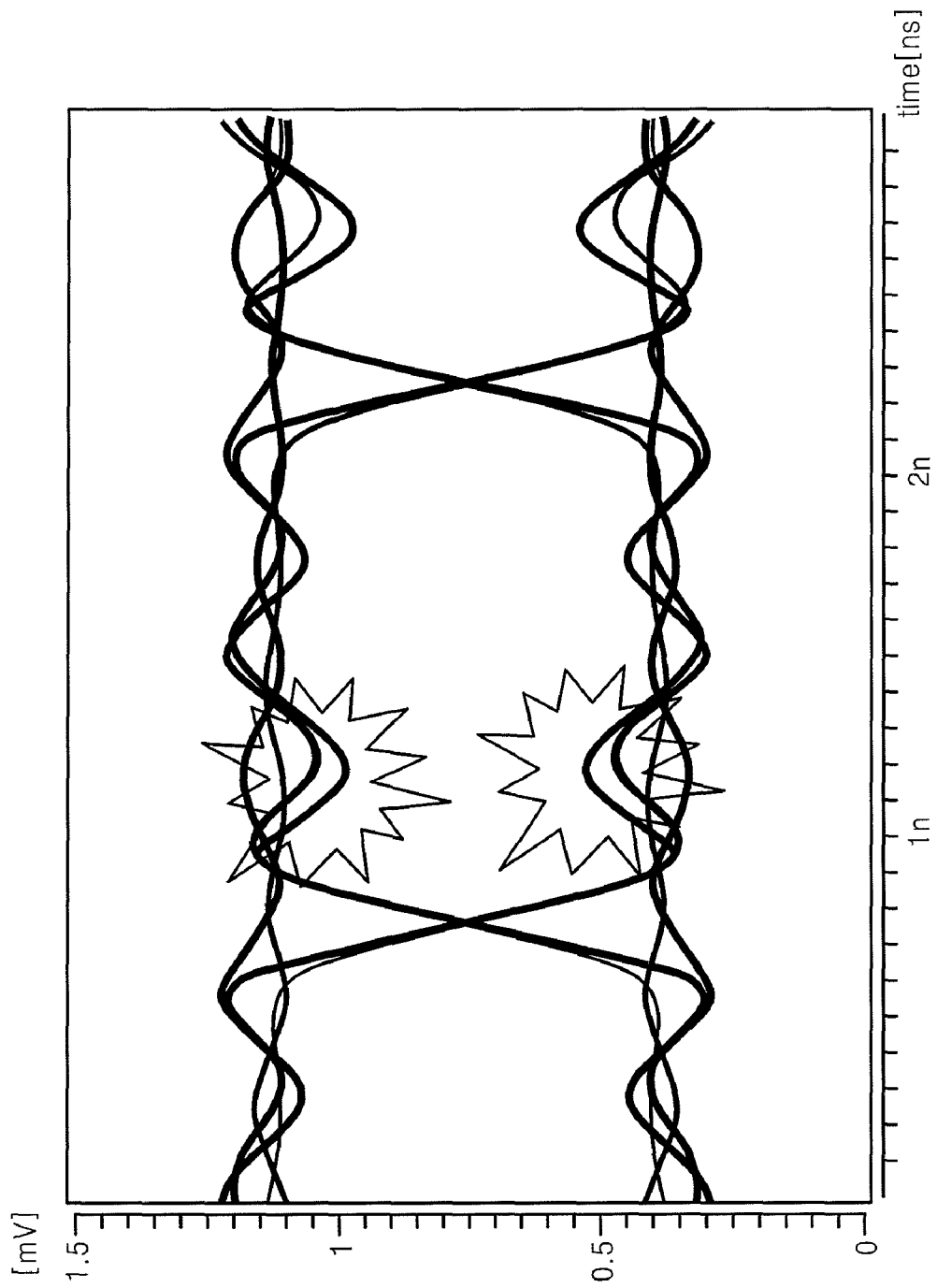
FIG. 5A is an eye diagram illustrating signal integrity of the memory module of FIG. 2.

The signal characteristics of the memory module 8 or 8' according to the exemplary embodiment of the present inventive concept will be described with reference to FIGS. 4 and 5A. FIG. 5A is an eye diagram illustrating signal integrity of the memory module of FIG. 2. FIG. 5B is an eye diagram illustrating signal integrity of the memory module of FIG. 3. Each of graphs of FIGS. 5A and 5B shows that digital waves generated for each data, for example, 0 or 1, are overlapped in units of periods, which is used to evaluate the quality of a signal.

In general, when noise is not generated by first read data, normal data read is possible in the next data read. However, when noise is generated by the first read data, the next read data is affected by the noise. That is, during a read operation, the memory module 8 or 8' outputs a control signal in each period. The output control signal is sequentially applied to the respective memory chips. When a read operation is performed in the second period, a control signal output in the second period overlaps a reflected wave generated in the first period so that signal distortion is generated. Thus, a malfunction in which data is incorrectly read from each memory chip during the data read may be generated.

Referring to FIGS. 2 and 5A, it can be seen that distortion of a digital signal is large in a particular period as illustrated in the digital waveform of FIG. 5A. This is because the reflected waves generated by the memory chips connected to the transmission line overlap with each other in a particular period.

Referring to FIGS. 3 and 5B, it can be seen that distortion of a digital signal is reduced compared to the digital waveform of FIG. 5A. The distortion in the digital signal is relatively reduced because the N-th memory chip of the memory chips and the other memory chips except for the N-th memory chip are connected to different buses so that the pattern lengths between the memory chips and the transmission line are set to be different from each other and thus the timing at which the reflected waves overlap with each other in a particular period is avoided.

In the conventional memory module 5, since the signal distortion is large in a particular period, margin width is small as illustrated in FIG. 5A. However, in the memory module 8 or 8', the signal distortion in the particular period is reduced so that the margin width is relatively increased as illustrated in FIG. 5B. As a result, it can be seen that the memory module 8 or 8' of the inventive concept provides better performance than the conventional memory module 5.

FIG. 6 is a graph illustrating signal integrity of a memory module according to an exemplary embodiment of the present inventive concept. Referring to FIG. 6, an output signal (a) of the conventional memory module 5 is greatly affected by the signal distortion as a plurality of reflected waves generated at the boundary portion between parts to transmit/receive a signal, for example, memory chips, and the transmission line overlap with each other in a particular period. However, in an output signal (b) of the memory module 8 or 8', the signal distortion is relatively reduced as the reflected waves do not overlap with each other in the particular period, but irregularly overlap with each other.

As described above, the memory module 8 or 8' according to the exemplary embodiment of the present inventive concept may extend the length of the transmission line, without a change of the conventional part arrangement and deposition structure, simply by changing the method of connecting a signal between the parts. Also, the memory module 8 or 8' may improve signal integrity in high speed communications, without an increase in the layout area, by changing the method of connecting a signal between the parts.

Figure 7:
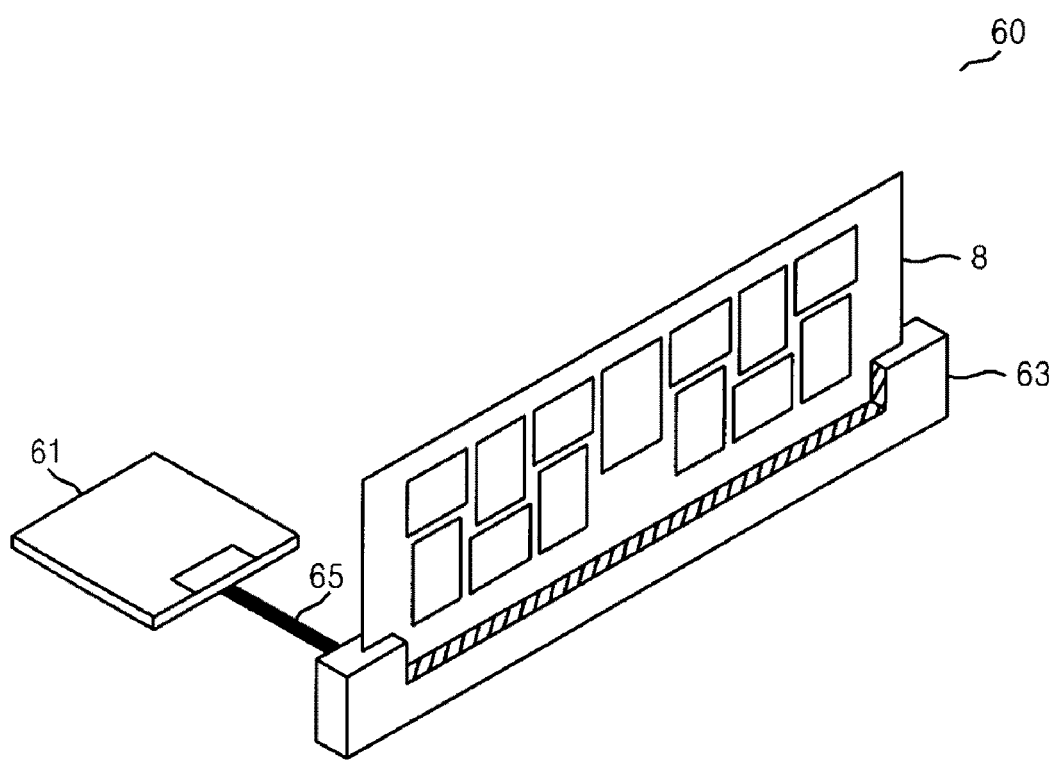
FIG. 7 is a block diagram schematically illustrating a computer system including a memory module according to an exemplary embodiment of the present inventive concept.

FIG. 7 is a block diagram schematically illustrating a computer system 60 including a memory module according to an exemplary embodiment of the present inventive concept. Referring to FIG. 7, the computer system 60 may include a processor 61, a memory slot 63, the memory module 8 or 8', and a data bus 65. The processor 61 may be a semiconductor device including a controller or a memory interface portion.

The memory module 8 or 8' is installed in the memory slot 63 and electrically connected to the processor 61 via the data bus 65. A plurality of memory chips are arranged in the memory module 8. The memory module 8 stores data, for example, video data or audio data, received from the processor 61 via the data bus 65, or outputs the stored data to the processor 61. The memory module 8 may be implemented on a memory card, for example, CompactFlash (CF) cards, Memory Stick cards, Memory Stick Duo cards, MultiMediaCards (MMCs), Reduced MMCs, secure digital (SD) cards, mini-SD cards, micro-SD cards or TransFlash cards, smart cards, and xD-Picture cards.

Each of the processor 61 and the memory module 8 may be implemented by volatile memory devices such as RAMs, or non-volatile memory devices such as ROMs, EEPROMs, or flash memories.

While the inventive concept has been particularly shown and described with reference to exemplary embodiments thereof, it will be understood that various changes in form and details may be made therein without departing from the spirit and scope of the following claims.

What is claimed is:

1. A memory module comprising:
   a plurality of buses; and
   a plurality of memory chips arranged close to each other along each of the plurality of buses,
   wherein an N-th memory chip, where N is an integer, of the plurality of memory chips is connected to one of the plurality of buses, and each of the other memory chips of the plurality of memory chips, except for the N-th memory chip, is connected to another one of the plurality of buses, and
   wherein the plurality of memory chips and the plurality of buses, including the one of the plurality of buses and the other one of the plurality of buses, are arranged by a fly-by topology.

2. The memory module of claim 1, wherein a pattern length between the N-th memory chip and the one of the plurality of buses is longer than a pattern length between each of the other memory chips, except for the N-th memory chip, and the other one of the plurality of buses.

3. The memory module of claim 1, wherein the N-th memory chip is the first memory chip of the plurality of memory chips.

4. The memory module of claim 1, wherein the memory module is a registered DIMM (RDIMM) or an unbuffered DIMM (UDIMM).

5. A computer system comprising:
a memory slot;
a memory module electrically connected to the memory slot, in which a plurality of memory chips are arranged; and
a processor controlling input/output operations of the memory module,
wherein the memory module comprises:
a plurality of buses; and
the plurality of memory chips arranged close to each other along each of the plurality of buses,
wherein an N-th memory chip, where N is an integer, of the plurality of memory chips is connected to one of the plurality of buses, and each of the other memory chips of the plurality of memory chips, except for the N-th memory chip, is connected to another one of the plurality of buses, and
wherein the plurality of memory chips and the plurality of buses, including the one of the plurality of buses and the other one of the plurality of buses, are arranged by a fly-by topology.

6. The computer system of claim 5, wherein a pattern length between the N-th memory chip and the one of the plurality of buses is longer than a pattern length between each of the other memory chips, except for the N-th memory chip, and the other one of the plurality of buses.

* * * * *